Jan. 3, 1956 G. A. LYON Re. 24,105

WHEEL COVER

Original Filed Sept. 27, 1945 2 Sheets-Sheet 1

Inventor
GEORGE ALBERT LYON by The Firm of Charlesworth Attys.

WHEEL COVER

Original Filed Sept. 27, 1945 2 Sheets-Sheet 2

Inventor
GEORGE ALBERT LYON by The Firm of Charles W. Hills Attys.

United States Patent Office

Re. 24,105
Reissued Jan. 3, 1956

24,105

WHEEL COVER

George Albert Lyon, Detroit, Mich.

Original No. 2,445,330, dated July 20, 1948, Serial No. 618,825, September 27, 1945. Application for reissue April 11, 1955, Serial No. 500,715

5 Claims. (Cl. 301—37)

Matter enclosed in heavy brackets [ ] appears in the original patent but forms no part of this reissue specification; matter printed in italics indicates the additions made by reissue.

This invention relates to improvements in wheel structures including ornamental cover means.

Automobile wheel design has been tending steadily toward larger tires and smaller wheels. As the load-bearing part or spider of the wheel has been reduced in size in conformity with the trend toward ever smaller wheels, the problem of attaching the ornamental cover structure has become proportionately more serious due to the limitations placed upon the area available for fastening the cover in place.

Various clip arrangements have been proposed and, in numerous instances, used with considerable success. However, clips require mounting perforations or openings in the wheel body or spider part and such openings have a tendency to weaken the spider or wheel body. This is especially true where the area of the body is reduced to such small proportions.

In the past it has been common practice in the automotive industry to construct wheels with spaced bumps or protuberances over which an underturned edge of a hub cap or cover is snapped for retention on the wheel. This snap on action necessitates stretching of the circular edge of the cap over the bumps in the application to or prying off of a portion of the edge relative to the bumps.

It is important that the bumps be provided in such manner that they will not materially add to the cost of the wheel body and at the same time not weaken the structural get-up of the body part which is the load-bearing member of the wheel.

Also I find that where an edge must be stretched or opened up at certain points in contact with the bumps there is a marked tendency at intermediate points for the edge to contract so that when such bumps are used the edge tends to assume a clover-leaf shape. Not only does the edge tend to assume a clover-leaf shape but at the intermediate points it flexes both inwardly and downwardly.

It is an aim of this invention to take full advantage of this contracting tendency, at spaced points of the edge, by providing a shoulder portion in the body part axially and radially inset from the contact points on the bumps whereby clearance is provided so that the portions of the edge between these points can effectively contract against such inset shoulder thus providing spaced gripping areas in addition to the contact points on the bumps themselves.

A further object of this invention is to utilize the shoulder inset from the bumps to provide clearance for the fulcrum of a portion of the edge as an opposite portion is being led and stretched over and behind an opposite bump.

To enhance this feature I purposely construct each bump with a lead-in surface whereby it can guide the edge portion to and over the bump.

Still another object of this invention is to utilize the inset shoulder of the body part as a seat for an inner edge of an outer trim ring whereby that edge can be brought in closer to the medial plane of the wheel and whereby the contracting portions of the cap edge between the bumps can clamp said ring edge radially and axially inwardly of and behind the bumps at three points. This enables flexing of the ring edge for clamping at a multiple of points without having to force or flex the ring edge in its entirety.

Yet another object of the invention is to so interrelate the offset bumps and the inset shoulder that a minimum amount of material is required therein, and so that a minimum amount of material need be bulged outwardly in the forming or blanking of the wheel body. This enables the body part to possess the requisite structural and stress resisting rigidity with a minimum amount of material. Then, too, through the use of my present invention it is not necessary to work all of the material of the body part since only the bumps are pressed outwardly thereby enabling a very strong and light weight body member.

Another important object of the present invention is to provide an improved wheel structure in which the ornamental cover is quick-detachably mounted or secured to the wheel body in such a manner as to be free from any tendency to become accidentally dislodged.

Another object of this invention is to provide a simple and highly ornamental wheel structure in which a trim ring and hub cap are combined in an improved manner with the wheel body.

Yet another object of this invention relates to the provision of a simple and efficient hub cap and snap-on mounting therefor.

A further object of the invention is to provide an improved attachment for a snap-on type of hub cap.

Still another object of the invention is to provide improved means for detachably securing a trim ring cover portion to the body of a wheel.

Still another object of the invention is to provide a cover assembly for a wheel wherein the cover may be detachably connected on the wheel in close proximity to the base flange of the tire rim and relatively close to the medial plane of the wheel.

In accordance with the general features of this invention, there is provided in a wheel structure including a wheel body part and a tire rim, a plurality of, preferably three, snap-on bumps integrally formed in the body part to face radially outwardly and slightly axially inwardly and in concentric equally spaced relation about the wheel axis, and slightly offset radially outwardly from a concentric radially outwardly facing shoulder on the wheel body, so as to receive and flex the engaging edge of a flexible hub cap and force the portions of the hub cap edge intermediate the snap-on bumps to draw radially inwardly against said shoulder and secure the underlying attachment flange portion of a trim ring against the shoulder.

Another feature of the invention relates to the provision of a two-part ornamental cover for a small wheel wherein the cover comprises a trim ring adapted to simulate and provide an apparent inward extension of the side wall of a tire, and the hub cap is of live resiliency cooperative in snap-on demountable relation with generally radially disposed relatively offset shoulders on the body of the wheel to retain the hub cap in place and clamp the trim ring securely in position.

Still another feature of the invention resides in the provision of an inner cover member or hub cap of live resiliency having a beaded resilient attachment edge cooperative with radially offset shoulder means on the wheel body in such a manner that the resilient edge is deflected outwardly at a multiplicity of spaced points to draw and swing axially and radially inwardly the intermediate portions of the deflectable edge to engage and clampingly push the underlying portions of a trim ring member against the opposing portions of the shoulder and the wheel body at the base of the shoulder.

A still further feature of the invention relates to the novel formation of relatively offset shoulder means on a wheel body to receive a flexible cover member such as a hub cap in snap-on relation to place the resilient edge of the hub cap under deforming tension at a plurality of spaced points, so as to deflect and resiliently deform the intermediate portions of the hub cap edge to bottom snugly axially inwardly against the opposed portions of the wheel body and radially inwardly against the contiguous portions of the shoulder structure.

Other objects, features and advantages of this invention will more fully appear from the following detailed description, taken in connection with the accompanying drawings which illustrate certain embodiments thereof and in which—

Figure 2:
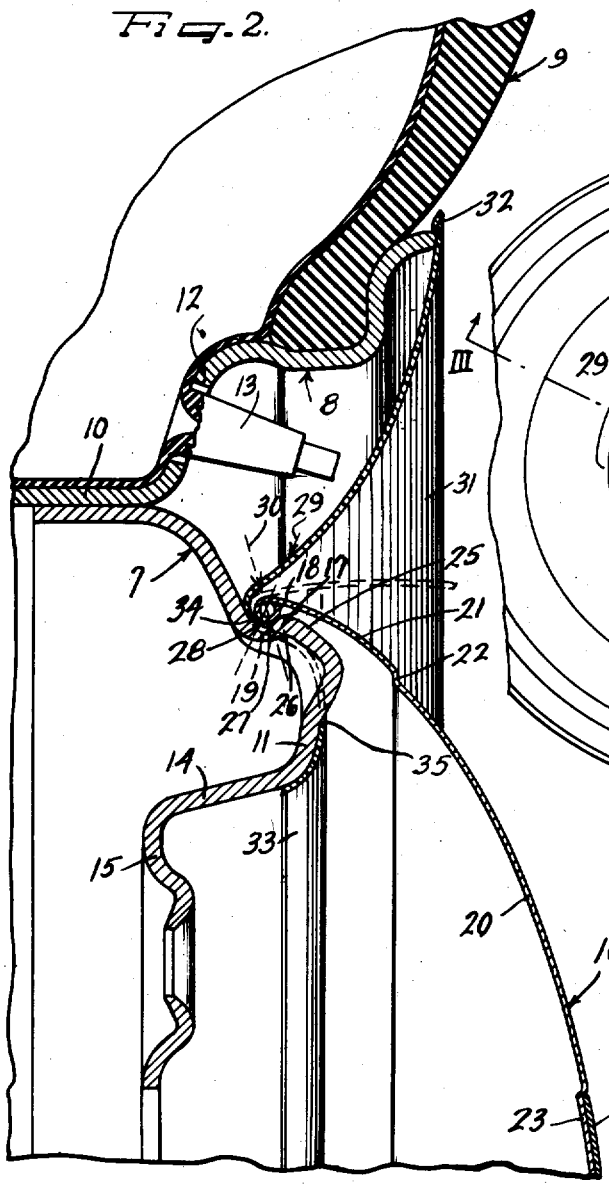
Figure 2 is an enlarged fragmentary sectional view taken on substantially the line II—II of Figure 1.

A wheel of the kind with which my invention is adapted to be employed comprises a body or load-bearing part 7 supporting a tire rim 8 which may be of the popular drop-center type to receive a tire and tube assembly 9. The tire rim 8 may be of the customary multi-flanged construction having a relatively narrow base 10 to which the body portion 7 is attached and extends outwardly in preferably curved cross sectional form to an annular bulged nose portion 11 which acts as a rigidifying corrugation. In the outer side of the tire rim adjacent to the base 10 is an aperture 12 enabling passage of the usual valve stem identified at 13, which projects into the annular groove-like channel defined between the tire rim and the reinforcing nose portion 11 of the wheel body.

The nose portion 11 extends axially outwardly somewhat less than the axial spread of the tire rim 8 and recedes axially and radially inwardly to define a centrally dished portion 14 which terminates in a generally radially extending bolt-on flange 15. This flange, as in the common practice, is apertured to accommodate bolts or cap screws (not shown) for securing the wheel to a part on an axle of a vehicle. It will be appreciated, of course, that by reason of the bulgingly reinforced construction of the load-bearing member or body 7 of the wheel it is structurally characterized to be capable of fully withstanding even the most severe road conditions. Due to the great stresses or strains to which the body member 7 is subjected in use, and especially due to the relatively small over-all area of the body member, any holes or apertures such as might be provided for accommodating securing clips for cover parts are undesirable, because of the weakening effect thereof upon the body. This is especially true at the rigidifying bulge 11, which is obviously one of the more stressed portions of the body part and is relied upon, to a large extent, to resist distorting strains and stresses. However, it is quite necessary, both for the sake of appearance and protection, to provide a cover for at least the hub portion of the body part 7 and preferably also the tire rim 8 and the intervening relatively deeply channeled space between the tire rim and the body part. This requires something for effecting attachment of the cover.

Since it is necessary to have access to the hub portion of the body and especially the bolt-on flange 15 for applying and removing the wheel, the cover must be readily detachable. Similarly the valve stem 13 must be readily accessible and the design and construction of the cover must be such as to permit it to be readily opened. While, as shown, the valve stem is concealed behind the cover, alternatively, of course, the valve stem might project through the cover, in which case the cover construction would have to be properly designed to afford the necessary clearance.

According to the present invention, an improved snap-on mounting for an inner cover member or hub cap 16 is afforded without aperturing the body member 7, by providing integral radially and axially outwardly protruding projections, or as more generally referred to, "bumps" 17 on the reinforcing nose 11. The hub cap 16 is of flexible construction and has the edge thereof reinforced by a continuous spring bead 18 which has snap-on cooperation with the attachment bumps 17. By preference there are three of the bumps 17 equidistantly angularly spaced about the nose 11 and each bump protrudes both axially and radially outwardly beyond the nose.

Although some attempts have been made to secure the hub cap in place through the medium of simple bumps on the wheel body, there has existed a tendency for the hub cap to pop off. Then, too, in order to enable quick prying off of the hub cap it is necessary to so design the bumps that undue or damaging resistance will not be opposed to the pry-off tool. Therefore, the designer is faced by the dilemma of attaining a secure attachment while at the same time permitting ready intentional detachment.

With prior constructions designed to meet both of these requirements, the aim has been to concentrate to the fullest extent possible all of the tension of the cover at the point of contact with the bumps, in order to secure as strong as possible a grip upon the bumps. Under ideal dirt-and-wear-free conditions the results are reasonably satisfactory, but if the hub cap is not fully pressed into place, as might result from carelessness or the interposition of dirt or foreign matter between the edge of the hub cap and the opposing portion of the body at the base of any bump, a jar or blow or even merely the operating vibrations of the wheel may in some cases cause the hub cap to pop off.

By a unique construction and relationship of the hub cap 16 and the bumps 17 of the present invention, in conjunction with a cooperative annular outwardly radially and slightly axially outwardly facing inset shoulder 19 on the body member 7, and more particularly the nose portion 11, I have overcome all of the aforementioned difficulties and have provided a cover construction that can be easily and quickly applied or removed and which functions with surprising effectiveness to resist accidental popping off of the hub cap and yet still enables easy application and removal of the hub cap.

To this end, the hub cap 16 is of an especially live, resilient construction having a main portion 20 formed on a relatively large radius and an annular rim portion 21 of shorter radius integrally joined to the main portion through a reinforcing deformity or rib 22 and formed with the reinforcing and attachment bead 18 along its outer edge. Although thin, tough, resilient steel is a very desirable material from which to make the hub cap 16, it is obvious that it can also be made advantageously from suitable plastic material characterized by adequate toughness and resiliency. If preferred, the central portion of the main hub cap body 20 may be formed with a circular depression 23 to receive a name plate or medallion 24.

Due to its live resiliency, the hub cap 16, and especially the attachment rim portion 21 thereof, is particularly sensitive and responsive to deflecting forces or pressure and reacts uniformly and positively to yield in springing it on or off of the bumps 17. Since the cover is resiliently spread at the points of engagement with the bumps 17, the beaded margin 18 has a reaction or tendency to resiliently deflect radially inwardly and axially inwardly, and this reaction is utilized in attaining the surprisingly effective holding qualities of the present invention.

This result is accomplished by having the active radially outwardly facing holding surface of each of the bumps 17 of relatively smooth curvature, so that it has a smooth lead-in cam surface 25 extending obliquely radially outwardly and axially inwardly over which the bead 18 is pressed until it rides and is led over a radially outwardly smoothly rounded protruding nose 26. Thence, the bead 18 rides axially inwardly and contracts radially inwardly onto a receiving shoulder 27 forming a generally radially outwardly, axially inwardly facing wall of a groove 28 which is reentrantly disposed at the base of each bump.

Even the most reentrantly disposed portion of the groove 28 is disposed in radially outwardly spaced relation to the inset shoulder 19, and such reentrant portions of the grooves of all of the bumps 25 thus lie on a theoretical circumference of greater diameter than the shoulder 19. Such theoretical circumference is greater than the diameter of the circumference of the shoulder 19 to substantially the same extent that it is greater than the normal inside diameter of the bead 18, which, by the same token, is of substantially the same or slightly larger diameter than that of the circumference of the shoulder 19.

As a result, when the hub cap 16 is actually forced into place over the bumps 17 a substantial three-point stretch is necessarily effected in the main portion of attaching bead 18 and the contiguous portions of the hub cap, and this generates a resilient reaction in the portions of the cover intermediate the points of stretch or deflection, which drives intermediate portions of the bead 18 hard toward the shoulder 19 by its radial inward deflection, and at the same time axially inwardly toward engagement with the portion of the body member 7 contiguous to the base of the shoulder 19. The direction of the force generated by this reaction is indicated schematically by the directional arrows 29. This, in turn, has the effect of substantially forcing the intermediate portions of the hub cap back to substantially their original contour or form and sets up a counter reaction at and adjacent to the point where the cover engages the bumps 17. As schematically indicated in Fig. 2 by the directional arrow 30, the counter-resultant force generated in the attaching bead 18 takes a direction radially inwardly, axially forwardly, intersecting the direction of the component of force of the intermediate portions of the cover as indicated by the arrow 29, and driving the bead hard against the shoulder 27, although at the same time tending to draw the bead at such point away from the contiguous portion of the body member 7.

Since there is no opportunity for the intermediate portion of the cover to flex inwardly and thus diminish the hold of the bead 18 upon the bump shoulder 27, but rather, by reason of the engagement of the bead 18 at the intermediate portions thereof with the shoulder 19 and the body member 7, the bead is actually maintained at all times under unalterable strong gripping tension against the shoulder 27. Thus the cover or hub cap beaded edge 18 when in retaining engagement with the wheel assumes a shape resembling a clover-leaf with alternate portions axially bulged out at the three bumps 17 and axially inwardly at points intermediate the bumps and against the inset shoulder 19.

In addition, since the intermediate portion of the bead 18 throughout the main extent of each section thereof intervening between the bumps 17 is driven positively toward engagement with the shoulder 19 and the body 7, the hub cap 16 is held quite positively against any relative rotary movement which might tend to cause wearing of the parts, and resulting looseness. Due to the various reactionary and counter-reactionary tensions developed in the hub cap 16 it tends to seat itself. Once the bead 18 has been pushed beyond the bulge or hump 26, as evidenced by a snapping action, the cover is actually drawn in the direction of the applied force and away from the hand of the person applying same. Obviously, with the strong deflection toward the shoulder 19 and bottoming against the body member 7 and the grip against the bumps 17, the hub cap 16 is held very firmly and permanently rattle-proof.

I have discovered that, in sharp contrast to the difficulty of utilizing a prior form of bump-held hub cap to retain a trim ring in place, the construction just described is remarkably well suited for this very purpose. Hence, I provide an outer cover or trim ring member 31 so proportioned and dimensioned that it completely ornamentally conceals and protects the remainder of the body member 7 radially beyond the edge of the hub cap 20 and all of the outer side of the tire rim 8. Any suitable material may be used for the trim ring 31 such, for example, as strip steel, molded plastic or the like, but for most purposes a synthetic plastic such as ethyl or cellulose acetate, or vinyl resin, is preferred. When made of such a plastic the trim ring is quite form-sustaining but at the same time highly flexible, so that it is far less liable to damage from indentation by blows thereagainst, while at the same time it can be readily manipulated for access behind the ring for cleaning or to reach the valve stem 13, and yet will always return back to its original shape when released.

By preference the trim ring 31 is of curved cross-section in outwardly bowed or concave-convex form and extends from slightly beyond the outer edge of the tire rim 8 curvingly axially and radially inwardly until it meets the wheel body member 7 adjacent to the reentrant groove 28 at the bases of the bumps 17. In this way the trim ring 31 may be utilized to appear as a substantially radial inner continuation of the side wall of the tire 9, the illusion being accentuated by having the trim ring of substantially matching external white appearance as the side wall of a tire. Thus, the tire can be given the appearance of being much more massive than it really is, the illusion being such that the tire appears to extend all the way to the outer edge of the hub cap 16. At its outer edge the trim ring 31 may be slightly turned as at 32 so as to overhang the outer edge of the flanged tire rim in close proximity to the curved outer side wall of the tire.

For effectually clamping the trim ring 31 the inner margin thereof is preferably fashioned to conform in complementary internested relationship with the shoulder 19 and the reinforcing nose portion 11 of the body member of the wheel, a snugly seating flange 33 being provided for this purpose from said margin. To clear the bumps 17, the flange 33 is appropriately cut out or notched at appropriate points as indicated at 34. This provides axially extending edges 35 at the notches 34 flanking each side of each of the respective bumps 17 and holding the trim ring against rotation relative to the wheel.

By reason of the complementary shape of the flange 33 to the reinforcing nose 11 and the shoulder 19, the trim ring is provided with a reentrant groove 36 where it bottoms in the groove at the base of the shoulder 19. Within this reentrant groove 36 the intermediate portions of the attaching bead 18 of the hub cap are received to exert their tension pressure in the direction of the arrows 29 as previously described. This tightly clamps the trim ring in place on the wheel. More particularly the inner edge of the trim ring 31 is deflected at three points against the wheel body part 7. Hence, the entire edge of the ring does not have to be deflected in order to be effectively clamped to the wheel under tension.

On the other hand, since the notches 34 in the trim ring flange entirely clear the attaching bumps 17, complete freedom of effective operation of the attaching bead 18 in securing the hub cap 16 to the wheel is provided for. Since the normal position assumed by the attaching bead 18 on the bumps 17 is in relatively spaced relation to the adjacent portion of the wheel body 7, the adjacent inner edge portion of the trim ring bordering the respective slots 34 can be received closely within the base of the associated groove 28 without any effect whatsoever upon the bead 18. Thus, there is at no time any even slight interference from the trim ring 31 with proper and completely efficient attaching grip of the hub cap bead 18 with the bumps 17 and there is accordingly no interference which might in any manner tend to cause the hub cap to pop off. On the other hand, the intermediate gripping portions of the bead 18 operate with smooth effectiveness to clamp the trim ring in place and the thickness of the trim ring interposed between the bead 18 and the shoulder 19 and contiguous areas of the body 7 merely enhance the tension of the intermediate portions of the hub cap and, if anything, improve the counteracting grip imparted to the portions of the bead 18 which engage the bumps 17.

By having the reentrant groove 36 in the trim member 31 curved on a small though substantial radius, a strong resilient hinge is afforded which will permit the trim ring 31 to be swung open by manually flexing it away from the tire rim 8 to swing on the hinge. Due to the curvature of the hinge portion and the inherent resiliency of the material of the trim ring, the liability of fatigue failure due to repeated openings of the cover as, for example, in the region of the valve stem 13 to gain access thereto in supplying air to the tube of the tire 9, is practically eliminated.

Figure 1:
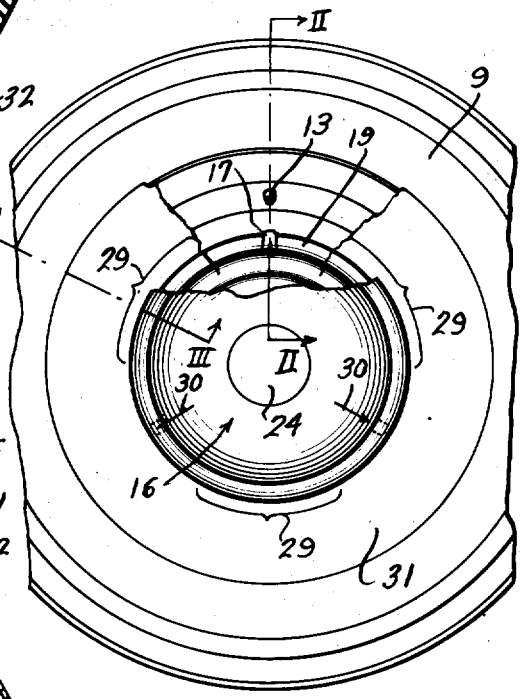
Figure 1 is a fragmentary side elevational view of a wheel structure embodying the features of this invention, and with certain parts partially broken away to reveal details of the structure.
Figure 3:
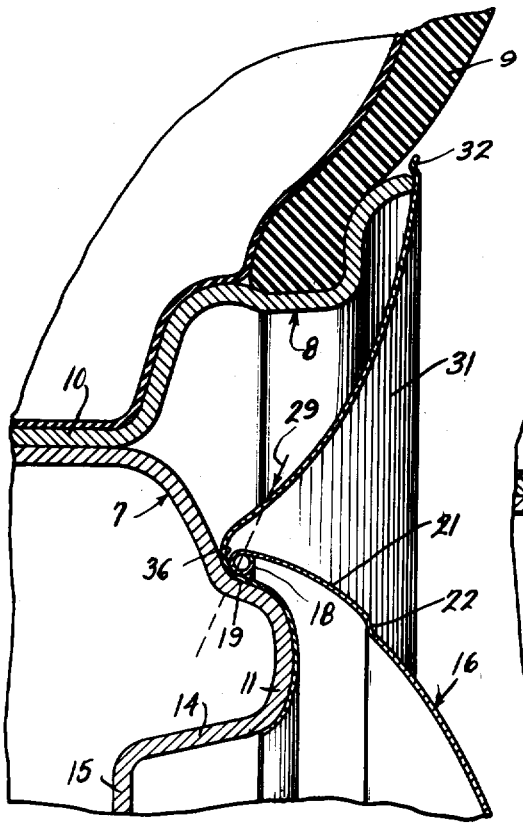
Figure 3 is an enlarged fragmentary detail sectional view taken on substantially the line III—III of Figure 1.
Figure 4:
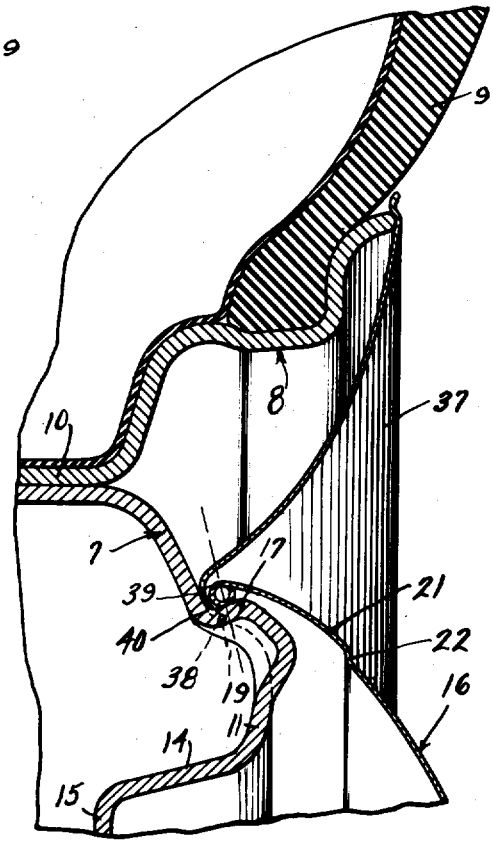
Figure 4 is a fragmentary sectional view similar to Figure 2 but showing a slightly modified form of the invention.
Figure 5:
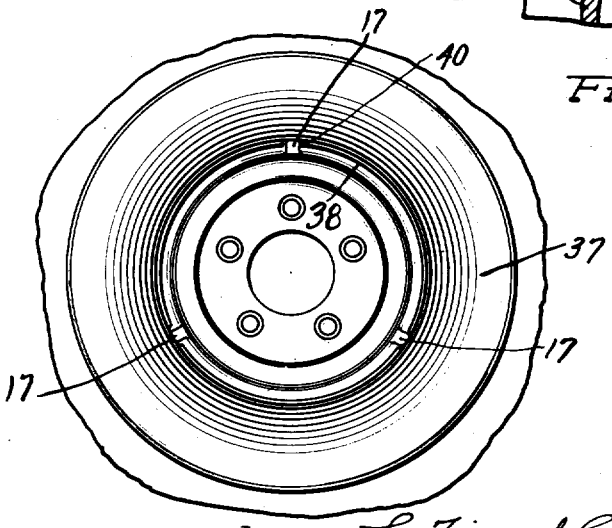
Figure 5 is a fragmentary side view of the wheel structure embodying the modified form of Figure 4 and with the central hub cap portion of the cover removed.

Although the cover construction including the trim ring 31 which has just been described is economical to manufacture, further economy can be effected by slightly reducing the amount of material in the trim ring. Accordingly, having reference to the modified construction shown in Figs. 4 and 5, a trim ring 37 is provided having a substantially shorter inner wheel body engaging flange 38 than in the previously described trim ring 31. Thus, the clamping flange 38 is merely an outwardly turned curved marginal portion providing a heel 39 adapted to seat within the groove between the shoulder 19 and the adjacent portion of the wheel body 7 and having its edge resting against the shoulder 19. Clearance for the respective bumps 17 is provided for in the flange 38 by appropriate notches 40. In all other respects the trim ring 37 is like the trim ring 31, and the cooperation of the hub cap 16 in clamping the flange 38 in place to hold the cover in position is substantially the same as that previously described with respect to the flange 33 as shown in Fig. 1.

It may be noted that all forms of the instant invention are especially suitable for use with very small wheels. By means of the novel attaching relationship effected through the medium of the bumps 17, and shoulder 19 and the hub cap 16, the necessity for providing substantial space between the hub cap and the wheel body to accommodate clips or the like is entirely avoided and therefore the hub cap can be brought quite close to the nose 11 of the wheel body and with its edge as close as practicable adjacent to the juncture of the tire rim and the wheel body. Furthermore, since the trim ring portion of the cover is effectively secured in place by the edge of the hub cap, all need for special connecting means for the trim ring is avoided. Instead, the consolidated hub cap and trim ring cover structure and unitary attachment device of the present invention affords a compact, simple and efficient construction which is readily adaptable to the smallest automobile wheel sizes.

Furthermore, the interrelationship of the retaining bumps 17 and the inset shoulder 19 is such that a minimum amount of metal and working is required in the blanking of the wheel body. In fact the bumps may be easily pressed from the nose portion 11 of the body part after the shaping of the body part.

Attention is also directed to the fact that while I have illustrated my invention as being preferably embodied in a wheel structure employing three spaced bumps or protuberances 17, satisfactory results may be obtained by the use of either four or five bumps. However, I find it desirable to keep the number of bumps at a minimum and believe that the best results are obtained through the use of three equidistantly spaced bumps.

I claim as my invention:

1. In a wheel structure of the type including a wheel comprising a tire rim and a central body part having circumferentially spaced cover retaining integral bumps and a detachable circular cover with a springy continuous turned edge having portions springy radially outwardly over the bumps and intermediate portions springy inwardly against the wheel body, characterized by the bumps each having an axially inward undercut outer shoulder and the body having a generally axial annular shoulder radially inward of the bases of said bump shoulders at the junction of said bump shoulders with the body part and of a diameter substantially less than that of the circle common to the bases of the shoulders of the bumps to provide clearance for the intermediate portions of said cover edge to spring radially inward of the bump shoulders and tightly against the wheel body.

2. In a wheel structure including a wheel comprising a tire rim and a central body part having an outer sideface to receive a circular wheel cover provided with a continuous springy turned edge detachably engaged with spaced bumps on the outer side of the body part, said body part having on its outer side a generally axially extending annular shoulder of a diameter substantially less than that of said springy edge, portions of the bumps being engageable by said springy edge in close proximity to the junctions of said bumps with the body part and projecting radially outward of said annular shoulder to provide clearance for portions of said springy edge to spring radially inward into tight engagement with said wheel sideface as other portions of the edge engaging said bumps are stretched radially outward whereby said edge engages the wheel body both at the bumps and at portions between the bumps.

3. In a wheel structure including a wheel comprising a tire rim and a central body part having an outer sideface to receive a circular wheel cover provided with a continuous springy turned edge detachably engaged with spaced bumps on the outer side of the body part, said body part having on its outer side a generally axially extending annular shoulder of a diameter substantially less than that of said springy edge, portions of the bumps being engageable by said springy edge in close proximity to the junctions of said bumps with the body part and projecting radially outward of said annular shoulder to provide clearance for portions of said springy edge to spring radially inward into tight engagement with said wheel sideface as other portions of the edge engaging said bumps are stretched radially outward whereby said edge engages the wheel body both at the bumps and at portions between the bumps and a circular trim ring positioned on the wheel radially outward of the bumps and having an inner retaining margin fitted over and clearing the bumps and having portions between the bumps engageable by the cover for deflection toward the wheel body and for clamping under tension against the wheel body by the cover.

*4. The structure of claim 1 further characterized by a further cover part notched to fit over said bumps and underlying said springy edge between the bumps to be clamped thereby to the wheel.*

*5. The structure of claim 2 further characterized by another cover part engaged with said bumps under the springy cover edge.*

(References on following page)

References Cited in the file of this patent or the original patent

UNITED STATES PATENTS

| | | |
|---|---|---|
| Re. 21,179 | Lyon | Aug. 22, 1939 |
| 2,085,647 | Freeman | June 29, 1937 |
| 2,196,718 | Ash | Apr. 9, 1940 |
| 2,200,205 | Lyon | May 7, 1940 |
| 2,244,014 | Lyon | June 3, 1941 |
| 2,263,243 | Lyon | Nov. 18, 1941 |
| 2,293,067 | Lyon | Aug. 18, 1942 |